(12) United States Patent
Hunter et al.

(10) Patent No.: US 7,506,455 B2
(45) Date of Patent: Mar. 24, 2009

(54) METROLOGY INSTRUMENTS

(75) Inventors: Stephen Paul Hunter, Bristol (GB);
Hugo George Derrick, Bristol (GB);
David Roberts McMurtry, Dursley (GB)

(73) Assignee: Renishaw PLC, Gloucestershire (GB)

( * ) Notice: Subject to any disclaimer, the term of this patent is extended or adjusted under 35 U.S.C. 154(b) by 439 days.

(21) Appl. No.: 10/576,026

(22) PCT Filed: Oct. 21, 2004

(86) PCT No.: PCT/GB2004/004489

§ 371 (c)(1),
(2), (4) Date: Apr. 17, 2006

(87) PCT Pub. No.: WO2004/004489

PCT Pub. Date: May 12, 2005

(65) Prior Publication Data
US 2007/0163137 A1    Jul. 19, 2007

(30) Foreign Application Priority Data
Oct. 21, 2003    (GB) .................... 0324519.8

(51) Int. Cl.
*G12B 21/24* (2006.01)
*G01B 5/00* (2006.01)
*G01B 5/12* (2006.01)

(52) U.S. Cl. .......................... 33/704; 33/556
(58) Field of Classification Search .......... 33/704, 33/556
See application file for complete search history.

(56) References Cited

U.S. PATENT DOCUMENTS

| 4,726,657 | A |   | 2/1988  | Perkins et al. |
| 4,741,112 | A |   | 5/1988  | Band et al. |
| 5,179,786 | A | * | 1/1993  | Shelton .................... 33/503 |
| 5,806,200 | A | * | 9/1998  | Brenner et al. ............ 33/559 |
| 5,829,148 | A | * | 11/1998 | Eaton ........................ 33/503 |
| 5,890,300 | A | * | 4/1999  | Brenner et al. ............ 33/503 |
| 6,202,316 | B1 |  | 3/2001  | Swift et al. |
| 6,438,856 | B1 | * | 8/2002 | Kaczynski ................. 33/503 |
| 6,633,051 | B1 |  | 10/2003 | Holloway et al. |
| 7,040,033 | B2 | * | 5/2006 | Zhu et al. ................... 33/502 |
| 2005/0011256 | A1 | | 1/2005 | Hoh |

FOREIGN PATENT DOCUMENTS

DE    202 19 108 U1    2/2003
WO    WO 02/080186 A1    10/2002

OTHER PUBLICATIONS

W.G. Weekers et al., "Compensation for dynamic errors of coordinate measuring machines." *Measurement*. Institute of Measurement and Control, London, 1997. vol. 20, No. 3, pp. 197-209.

* cited by examiner

*Primary Examiner*—Christopher W Fulton
(74) *Attorney, Agent, or Firm*—Oliff & Berridge, PLC

(57) ABSTRACT

A metrology instrument, such as a probe, probe head, stylus or stylus arm, for mounting on a coordinate position apparatus. The metrology instrument is at least partially constructed from at least one sheet of thermally stable metallic material which is folded to form a three dimensional structure. The at least one sheet of thermally stable material is utilized in the metrology loop of the metrology instrument.

24 Claims, 5 Drawing Sheets

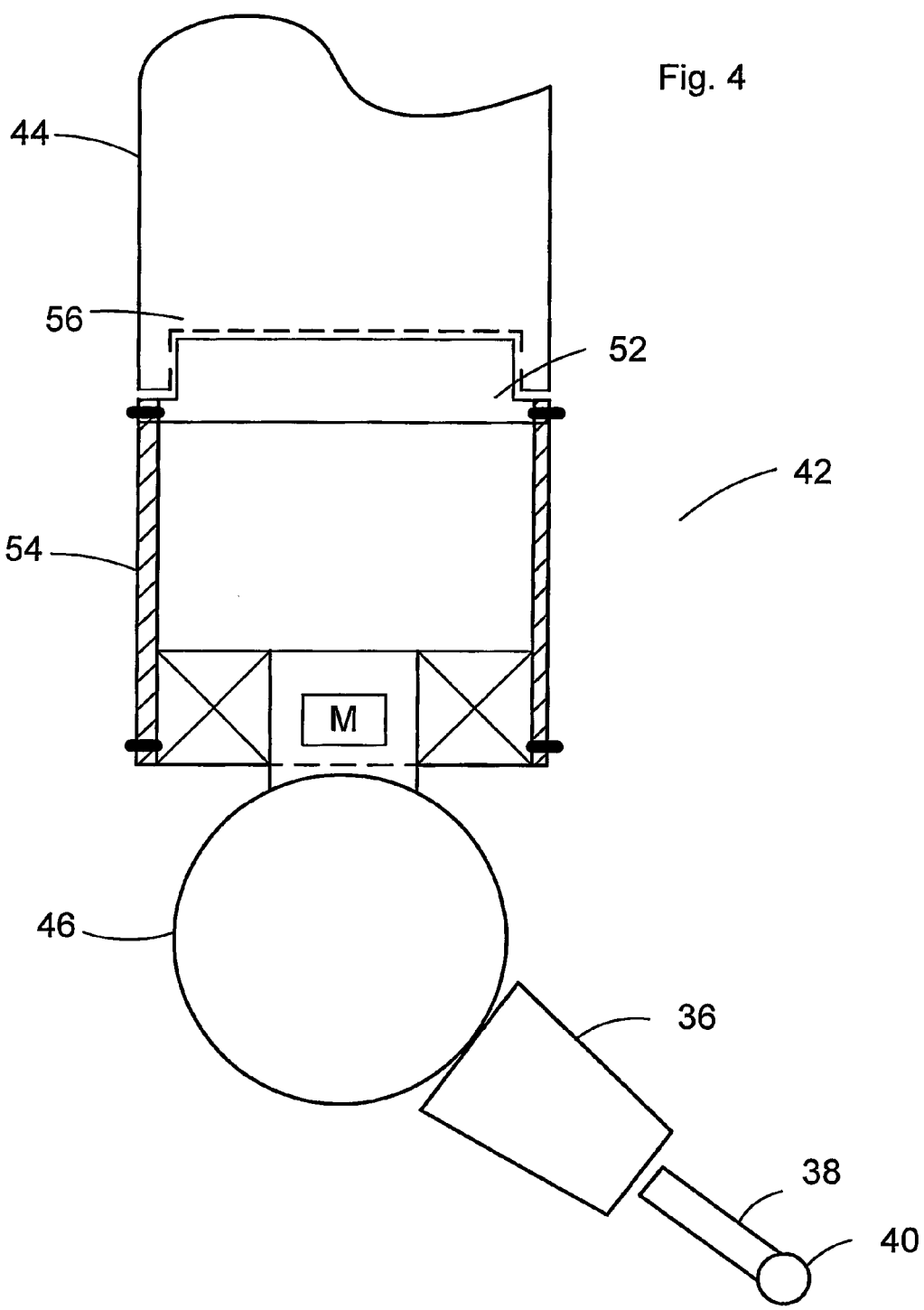

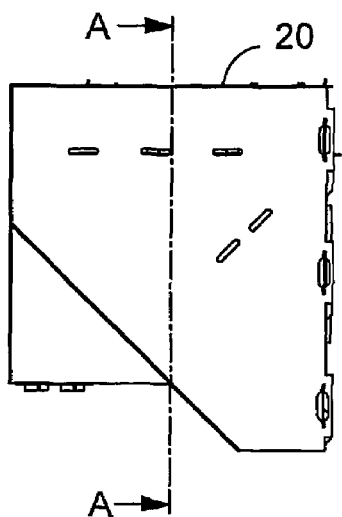
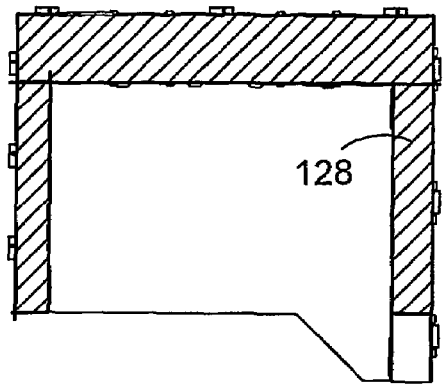
Fig 5a                Fig 5b
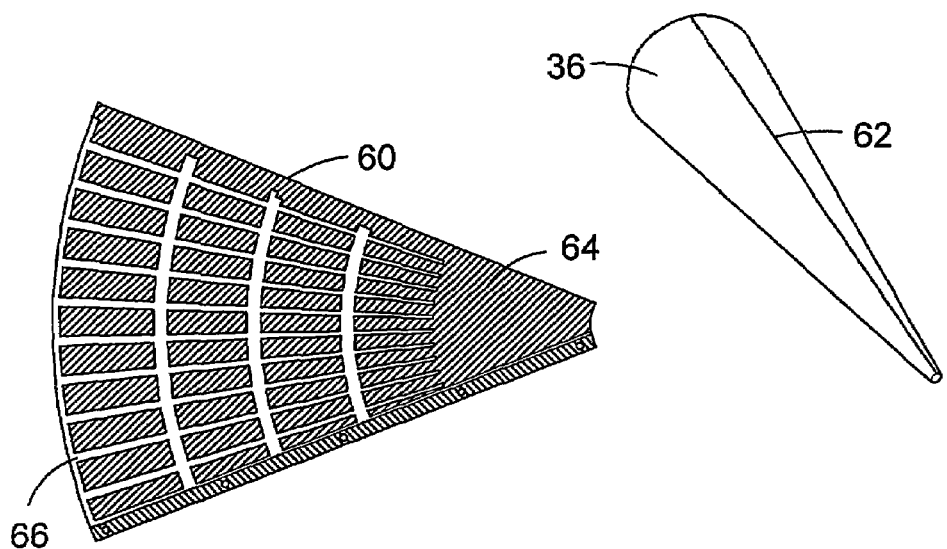
Fig 6a                Fig 6b

METROLOGY INSTRUMENTS

This invention relates to metrology instruments and in particular lightweight and thermally stable metrology instruments.

The term metrology instrument includes probe heads, probes, styli and non-Cartesian metrology frames.

It is known to provide probing apparatus for the surface scanning of articles to enable reproduction of an article or to ensure that manufacture of an article is accurate. It is desirable to increase the speed at which articles are scanned in order to reduce the time taken by this process. However, in order to maintain accuracy and keep within tolerance range when working at higher speeds, the effect of acceleration forces that the probing apparatus undergoes during a measurement process must be minimised. This requires a light and stiff stylus and probe structure to reduce bending during movement. Additionally, in order that resolution is maintained at higher speeds, so any fine detail of a surface profile is not lost, the metrology instrument must have a high frequency response. As frequency is proportional to $\sqrt{(k/m)}$, where k is stiffness and m is mass, it is desirable to have a metrology instrument with high stiffness and low mass to thereby achieve a high frequency response.

Another issue is the reproducibility of the measurements. One parameter that affects this is ambient temperature. All materials change dimensions as the temperature changes however, each material is affected differently. Along with the rate of dimensional change, the time it takes for a material to equilibrate is also important. Any expansion/contraction of a probe structure introduces errors in the measurement process. Thus, the thermal stability of the whole probe structure is also important.

The present invention provides a metrology instrument for mounting on a coordinate position apparatus, the metrology instrument being at least partially constructed from at least one sheet of thermally stable metallic material which is folded to form a three dimensional structure, the at least one sheet of thermally stable material being utilised in the metrology loop of the metrology instrument.

The term coordinate positioning apparatus includes coordinate measuring machines (CMMs), machine tools, inspection robots and manual machines.

The use of such a three dimensional structure made from sheet material enables a metrology instrument of the required stiffness to be made from thinner sheets of material resulting in a lower weight thus lower inertia article.

Preferably, the at least one folded sheet is joined. The joining method may include one or more of the following techniques: 'tabs and slots'; folded tabs and slots; gluing; welding; attaching to another framework. This further increases the rigidity of the structure formed from the at least one sheet of material.

A thermally stable material is one that has a coefficient of thermal expansion of $\leq 15$ ppm/° C.

Preferably the thermally stable material has a coefficient of thermal expansion of $\leq 6$ ppm/° C. More preferably the thermally stable material has a coefficient of thermal expansion of $\leq 2$ ppm/° C.

The three dimensional structure may include at least one walled cavity. The walled cavity may be filled with a low mass filler.

Preferably the at least one sheet is $\leq 1.5$ mm thick. The at least one sheet may be between 0.05-0.9 mm thick. More preferably the at least one sheet may be between 0.1-0.5 mm thick.

The metrology instrument may comprise, for example, a measurement probe, a stylus arm or a probe head.

For a probe head, the at least one sheet of material may be located between a fixed surface of the probe head and the arm of the coordinate positioning apparatus. The at least one sheet of material may be such that it at least partially encloses the fixed structure of the probe head.

A second aspect of the invention provides a method of manufacture of a metrology instrument comprising:
 providing at least one template of the metrology instrument from a sheet of thermally stable material;
 folding the at least one template to produce the metrology instrument.

Preferably the sheet of material is made from a thermally stable material.

The location of the folds may be determined by creating a series of perforations along the desired fold line of the sheet of material. The location of the folds may be determined by creating a fold line of partial thickness in the sheet of material.

Parts of the folded sheet material may be joined together by dip soldering.

The template may be formed from an etching process. The template may be cut from a sheet of material by a laser. The laser may be combined with a water jet.

Preferably, the sheet of material is made from a thermally stable metallic material. In this embodiment, the at least one template is preferably manufactured by removing surplus material from the sheets of material. The surplus material may be removed by laser machining, stamping, photo chemical machining (for example photo-etching and chemical machining) or any other suitable technique. The technique used will depend on the material properties of the sheets.

A third aspect of the invention provides a probe head for mounting on a coordinate position apparatus, wherein a structure comprising at least one sheet of thermally stable material is located within the metrology loop between a fixed surface of the probe head and the arm of the coordinate positioning apparatus.

The structure of the at least one sheet of material may be such that it at least partially encloses the fixed structure of the probe head. The structure may be formed from folding the at least one sheet of material.

The invention will now be described by example and with reference to the accompanying drawings, of which:

FIG. 4 shows a metrology instrument according to the invention;

FIG. 5a shows a side view through the folded structure of FIG. 2;

FIG. 5b is a cross-section A-A through the side view of FIG. 5a; and

FIGS. 6a and 6b shows a stylus arm according to the invention.

Figure 1B:
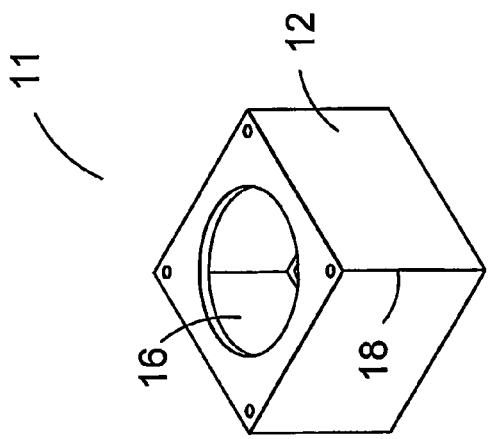
FIGS. 1a and 1b show a template and equivalent folded structure.
Figure 1A:
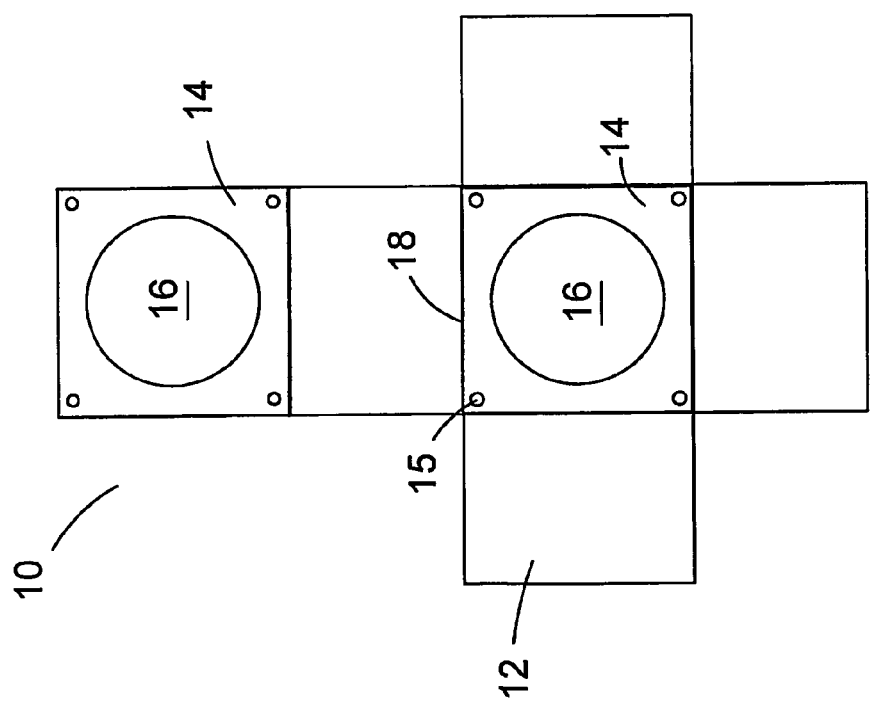

FIG. 1a shows a template 10 which comprises four rectangular sections 12 and two square sections 14. The square sections 14 each have a central cut-out circular region 16. Each section is joined to at least one other section by a seam 18.

The configuration of the different sections of the template is determined by the final shape of the structure that is to be created. In this case, the final structure is a box 11 (FIG. 1b) having closed side walls 12 and a circular opening 16 at each end defining an open tube which passes through the box 11. The template 10 is converted into the final structure by folding the template at each seam 18.

The template is formed from a metal sheet. The metal sheet may be any shape, e.g. including a strip. It is formed in the desired shape by any one of a number of standard techniques (for example laser machining, stamping, photo chemical machining). In particular, the shape of he template may be produced by etching. Wet etching is particularly suitable for materials such as Invar, as it doesn't affect the properties of the material.

The template may also be cut to shape using a laser. A known technique of combining a laser with a water jet is particularly suitable. This method has the advantage the work piece is cooled by the water jet and debris is removed as the template is cut, thus giving a minimal heat affected zone and enabling smooth clean edges to be produced.

The locations of folds can be accurately determined by suitable jigging or, either full or partial thickness chemical or laser machining. If full thickness machining is used, a series of perforations are machined along the fold line forming a weakness which is easier to bend. The perforations may comprise a series of slots. If a partial thickness machining process is preferred, the material at the point where a fold needs to be made is partially machined defining a seam which again weakens the material. Partial machining is a well known method achieved by carefully timing of the process so that portions of sheet which are exposed on two faces to the machining chemical or laser are fully machined during the process thus, portions of a sheet with only one face exposed are only partially machined. Defining the fold-lines is advantageous for three reasons firstly, this makes the material easier to bend into shape secondly, reproducibility of parts is increased and thirdly, the need for associated jigging can be obviated.

Folding the sheet material has the advantage of ease of manufacture over using a plurality of individual sheets joined together.

Figure 2:
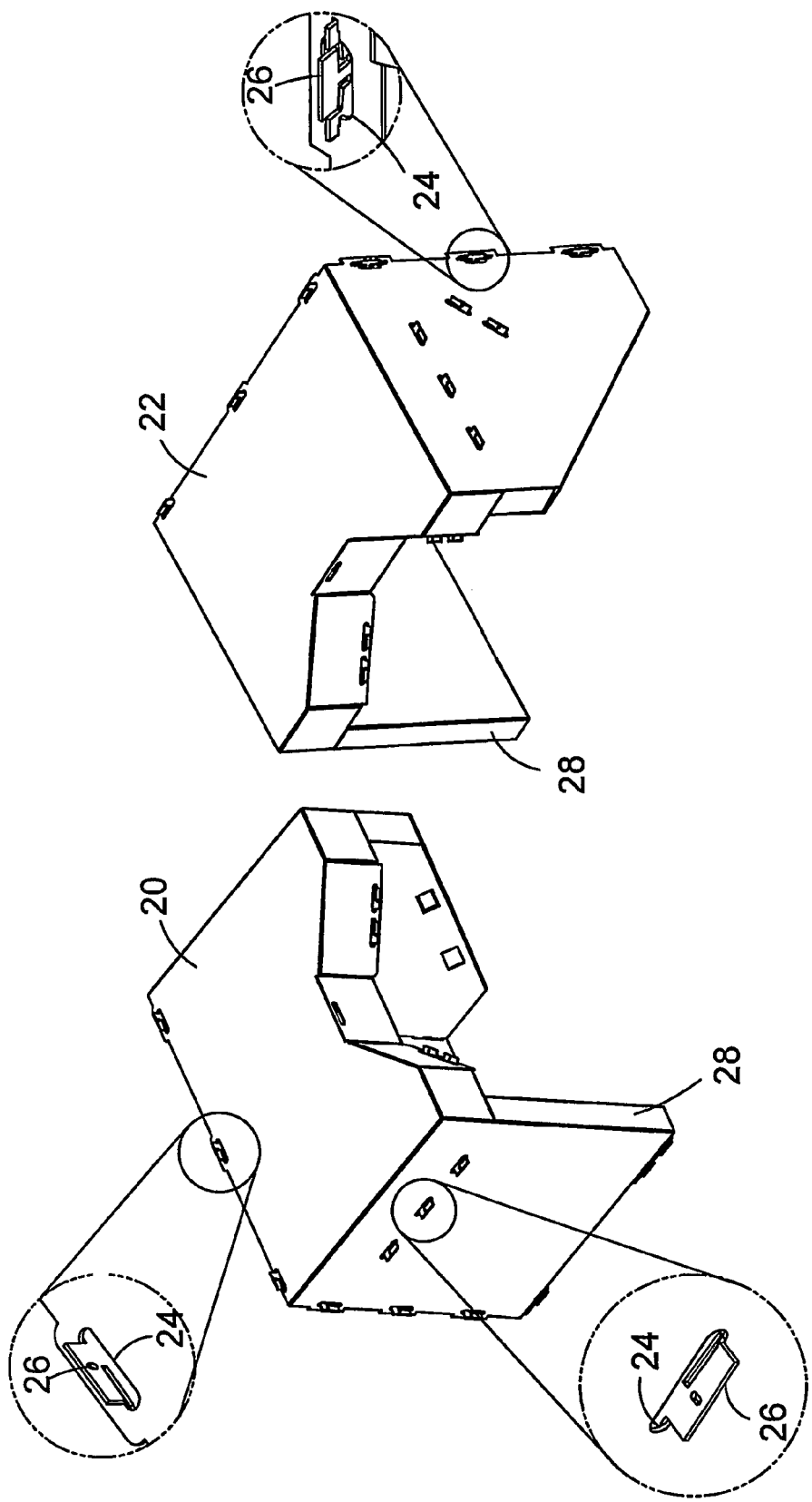
FIG. 2 shows an isometric view of a folded structure according to the invention.

Once the sheet has been folded it can be secured in place by any of a number of known techniques. FIG. 2 shows two folded structures 20, 22 which have been secured using slots 24 and corresponding tabs 26. The tabs 26 are inserted through slots 24 and then are bent through substantially 90° (not shown). The tabs and slots are accurately produced preferably during the same process as that when the template is produced and enable manufacture of the structure without the use of jigging. If the joints are welded to prevent removal of the tabs from the slots, the structure can be welded as is, without the requirement for a welding jig.

The folding and securing of the template results in a three dimensional structure having, where appropriate, walled cavities 28 within the overall structure to provide a stiff structure that does not bend appreciably either under the weight of the whole structure or during use. By having walled cavities, the sheet thickness used may be reduced resulting in reduced weight of the structure without a corresponding reduction in rigidity or stiffness.

The template may include a series of partial through thickness machined cut-outs which selectively reduce the thickness of the template by around a half resulting in further weight savings (see FIG. 6*b*).

Referring now to FIGS. 5*a* and 5*b* which show a side view of the folded structure of FIG. 2 and cross-section A-A through the side view respectively, when a walled cavity has been used, the inner cavity formed 128 can be filled with a foam to stiffen the structure and provide extra protection against buckling. Alternatively, foam blocks are used which are bonded to the folded structure. The inclusion of foam allows thinner sheets, or even partial through thickness sheets to be used without a reduction in desirable mechanical properties. A foam filling advantageously also damps the structure reducing the occurrence of back-to-earth vibrations from the movements of the structure. Other low mass fillers may also be used, for example low mass aerated fillers. These are advantageously adhered to the surface of the walled cavity to thereby act as a damper.

In this example, the three-dimensional structures are additionally spot welded (laser, resistance, E-beam or ultrasonic for example) in order to ensure that the tabs do not move within the slots over time (which movement could affect any measurements made by a probe structure). The spot welding is conveniently carried out where two walls of the structure abut or overlap.

In alternative method different parts of the folded structure are joined together using dip soldering. In this method, the sheet material is coated (for example by printing) with a resist, with only the parts to be joined (for example tabs) left uncovered. When the structure is assembled and dipped in solder, only the parts uncovered by the resist are joined by the solder. The sheet material may be treated, for example with a nickel plate, before the resist is applied, to assist the solder in fixing to the sheet material. This method has the advantage that it enables a lightweight join to be formed, with little manual input.

Figure 3:
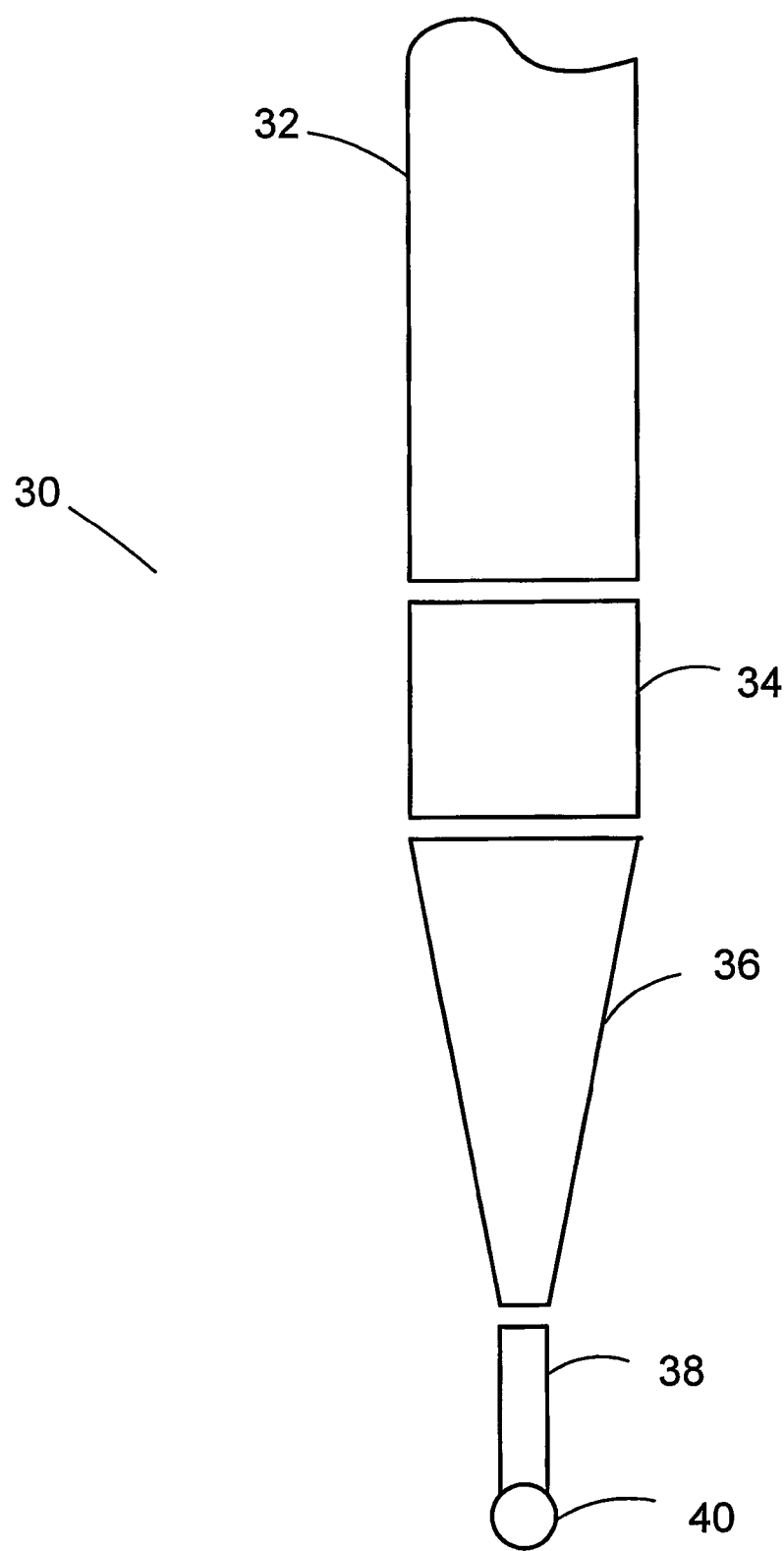
FIG. 3 shows a probe according to the invention.

FIG. 3 shows a probe structure 30. The probe structure 30 is releasably connected to a quill or spindle 32 of, for example, a machine tool, CMM or other measuring machine. The probe structure 30 includes a probe 34 which is mounted at one end to the quill 32. At the distal end of the quill, a stylus 38 is releasably connected to the probe 34, optionally via a stylus arm 36.

In the simplest embodiment of the invention, the probe 34 is mounted in a fixed relationship to the quill 32. In this situation, the movements of the stylus tip 40 are controlled by the movements of quill 32 with respect to a gantry (not shown) usually in x, y and z directions. When the quill 32 moves, there is a chance that the probe 34 and in particular any stylus arm 36 may bend due to inertial forces and/or acceleration forces. Any such bending will result in an inaccuracy in a measurement as the stylus tip will have bent away from its nominal position. In order to minimise any such bending, one or both of the probe 34 and stylus arm 36 are manufactured as a folded three dimensional structure.

The stylus may also be manufactured from sheet material which is shaped into a hollow cylinder. As before, this has the advantage of being light weight and stiff.

The probe can be contact or non-contact. Contact probes include touch trigger i.e. on/off, for example electrical and strain gauge; and scanning probes where the amount of deflection is measured for example, optical systems. Non-contact probes, where the surface of the workpiece is not touched include optical, inductance and capacitance systems.

The example in FIG. 3 uses a contact probe having an optical system in order to achieve a lightweight probe structure. Information from the stylus tip 40 is transmitted through a hollow folded stylus arm 36 and the probe structure optically, preferably by a laser system. One such system is described in WO 00/60310 which is herein incorporated by reference. The system briefly comprises shining a laser internally along the probe structure from a point distal the stylus tip to the stylus tip 40 and reflecting the light back to a receiver housed adjacent the incident beam. When the stylus tip is deflected, the lateral displacement of the reflected beam is detected indicating that the stylus tip 40 has contacted a surface.

Referring now to FIGS. 6a and 6b, the stylus arm 36 is cone shaped and manufactured from a sheet 60 of thermally stable material which is laser spot welded along a seam 62 which in this case lies longitudinally along the length of the stylus arm. The stylus arm 36 is not limited to being cone shaped, any structure which is stiff enough not to bend during movement of the probe and that has a central hollow to enable the passage of light through the stylus arm 26 to the stylus may be used. An alternative shape is triangular.

The metrology instrument (i.e. probe, probe head, stylus arm or stylus) may be manufactured from a thermally stable metallic material. This has the advantage that a metrology instrument manufactured from such a material has improved immunity to external temperature effects and internal heating effects (for example from electronics and motors). The term metallic material includes metal matrix composites, ceramic matrix composites with metal introduced and purely metal substances.

Examples of thermally stable metallic materials are Invar, Kovar, Inconel, Monel, Nichrome, although other suitable alloys will be apparent to the skilled person.

Values of the coefficient of thermal expansion are given in the table below.

| MATERIAL | COEFFICIENT OF THERMAL EXPANSION AT 20° C. $\times 10^{-6} K^{-1}$ |
| --- | --- |
| Invar | 1.7-2.0 |
| Kovar | 4.81 |
| Inconel | 13 |
| Monel | 13.9-14.1 |
| Nichrome | 14 |

Materials with a coefficient below 6.0 give good results whilst materials with a coefficient below 2.0 give the best results. Materials with a coefficient of less than 15.0, such as Nichrome, Monel and Inconel give much improved results over pure aluminium (which has a coefficient of 23.5) and stainless steel. The results can further be improved using thermal mapping software to correct for measurement errors of the metrology apparatus caused by thermal expansion. This is easier than for an aluminium structure as the thermal growth has been restricted by material choice.

The sheets are $\leq 1.5$ mm thick. In this range the sheet material is easy to handle. Preferably, the sheets are 0.05-0.9 mm thick. Below 0.05 mm the sheet material tends to be too flimsy, whereas above 0.9 mm it is difficult to bend the sheet material. More preferably, the sheets are 0.1-0.5 mm thick. Within this range, the best combination of lightness and stiffness is achieved.

These materials are expensive and difficult to machine. Therefore, the use of sheet material in the manufacture has the advantage that smaller amounts of material are used.

FIG. 4 shows a probe structure 42. In this example the probe is motorised i.e. the probe head 46 is movable independently of any quill 44 movements. The probe head 46 is mounted to the quill 44 at one end via a motor 52, bearing and encoder (not shown). The other end of the probe head 46 is connected to an optional stylus arm 36 and a stylus 38.

The use of a motorised probe head is advantageous particularly when scanning an article as it enables the stylus tip 40 to be moved faster than when quill movements solely control the movement of the stylus tip. Such a motorised probe head is described in EP402440. However, a side effect of having a motorised probe head is that is that on top of any external thermal fluctuations which will cause dimensional change in the probe structure, the motors produce heat when in use.

It is expensive to manufacture a motorised probe head from a thermally stable material. It would therefore be advantageous to be able to minimise the effects of heat produced by a probe head, whilst allowing it to be made from cheap and easily machined materials such as aluminium.

FIG. 4 illustrates a probe head 46 and a quill 44 of a coordinate positioning apparatus, such as a CMM. A hollow box structure 54, manufactured from a thermally stable material is mounted onto the quill 44 at its top end and onto a fixed surface 45 of the probe head at its bottom end.

The hollow structure 56 of the thermally stable box 54 enables part of the probe head 46 to be enclosed by the structure. Expansion of parts of the probe head is allowed within the thermally stable box 54, without affecting the metrology path. For example, motors M in the probe head cause heat which cause expansion of the bearings 47 and other structures.

The anchor point between the bottom end of the thermally stable box 54 and the probe head 46 is positioned as low as possible on the stationary part 45 of the probe head to minimise the amount of non-thermally stable material (and thus expansion) in the metrology path between the quill 44 and probe tip 40.

The thermally stable box may be formed for example from four sheets of thermally stable material joined at their edges. Alternatively, the sheet material may be folded to obtain the desired shape. The thermally stable structure is not limited to a box shape and other shapes may also be used.

In this embodiment thermal growth is allowed in the system outside the metrology loop, whilst expansion within the metrology loop is restricted. Thermal growth may be accommodated other than within the thermally stable structure, for example, within a recess in the quill.

The thermally stable structure 54 can be a single folded and joined sheet of a thermally stable material (for example as shown in FIG. 1). Additionally it may, comprise four rods of thermally stable material forming four corners of the structure (which can be located accurately using machined locating holes 15, FIG. 1), with optional cross members linking adjacent rods. The use of such rods enables thinner sheets of material to be used in the structure without a reduction in stiffness.

The probe structure may be attached to a quill or spindle which is moved manually or automatically. For both situations, the manner and method of moving the probe structure in each dimension will be apparent to those skilled in the art. An example of a manually moved structure is described in EP392699. An example of an automated structure is described in U.S. Pat. No. 6,047,612.

In both circumstances, having a thermally stable probe structure is important. For manually moved probe structures, reduced weight is advantageous as it means that the structure requires less counterbalancing to enable comfortable manual movement. It also reduces the inertia of the structure so control of any movement is increased.

For automatic movement, reduced weight is also advantageous. It means the speed of scanning can be increased as the inertia of the structure is proportional to its mass. Current systems generally operate at 5 mm/s although speeds of 50 mm/s are possible. The reason that the slower speed is used is partially due to the risk of loss of probe contact with an article being scanned, partially to reduce the chance of breakage of the probe structure when initially contacting a surface, and partially due to the frequency response of traditional structures results in a loss of high frequency data. The probe structure described herein is capable of higher speeds, up to around 500 mm/s, regardless of orientation and providing the same metrology performance as at lower speeds of movement.

FIGS. 6a and 6b show a template 60 for a stylus arm 36. The template 60 has been partially etched 64 to reduce the weight of the stylus arm 36. In this example, due to the pattern of chemical or laser machining used, this results in the unmachined parts becoming reinforcing ribs 66 which stiffen the structure.

In some circumstances, full machining of holes, similar to the perforations used to form a fold line, may be preferred to partial machining as it provides increased reduction in weight of the object in question however, to prevent ingress of dirt or other matter which may affect the functioning of the working parts of the metrology instrument, full machining should only be used where appropriate. If the foam filled embodiment is utilised, this will help prevent any such ingress when full machining is used.

In all of these embodiments, the folded sheet material is utilised in the metrology loop. The metrology loop is the path from the surface sensing device (for example the probe tip in a contact probe) through the apparatus to the bed on which the workpiece is mounted and hence to the workpiece. For example, in a contact probe mounted on a CMM, the metrology loop is from the probe tip, through the probe, the quill of the CMM, through the CMM to the table on which the workpiece is mounted.

Thus the properties of the folded metal sheet (such as stiffness, lightness and thermal stability) contribute to the accuracy of the measurements taken by the apparatus.

The invention claimed is:

1. A metrology instrument for mounting on a coordinate position apparatus, the metrology instrument being at least partially constructed from at least one sheet of thermally stable metallic material which is folded to form a three dimensional structure, the at least one sheet of thermally stable material being utilised in the metrology loop of the metrology instrument.

2. A metrology instrument according to claim 1 wherein the thermally stable material has a coefficient of thermal expansion of $\leq$ about 15.0 ppm/° C.

3. A metrology instrument according to claim 2 wherein the thermally stable material has a coefficient of thermal expansion of $\leq$ about 6 ppm/° C.

4. A metrology instrument according to claim 3 wherein the thermally stable material has a coefficient of thermal expansion of $\leq$ about 2 ppm/° C.

5. A metrology instrument according to claim 1 wherein the three dimensional structure includes at least one walled cavity.

6. A metrology instrument according to claim 5 wherein the walled cavity is filled with a low mass filler.

7. A metrology instrument according to claim 1 wherein the at least one sheet is $\leq$ about 1.5 mm thick.

8. A metrology instrument according to claim 7 wherein the at least one sheet is between about 0.05- about 0.9 mm thick.

9. A metrology instrument according to claim 7 wherein the at least one sheet is between about 0.1- about 0.5 mm thick.

10. A metrology instrument according to claim 1 wherein the metrology instrument comprises a measurement probe.

11. A metrology instrument according to claim 1 wherein the metrology instrument comprises a stylus arm.

12. A metrology instrument according to claim 1 wherein the metrology instrument comprises a probe head.

13. A metrology instrument according to claim 12 wherein the at least one sheet of material comprises thermally stable material and is located between a fixed surface of the probe head and the arm of the coordinate positioning apparatus.

14. A metrology instrument according to claim 13 wherein the structure of the at least one sheet of material is such that it at least partially encloses the fixed structure of the probe head.

15. A method of manufacture of a metrology instrument comprising:
providing at least one template of the metrology instrument from a sheet of thermally stable metallic material;
folding the at least one template to produce the metrology instrument.

16. A method according to claim 15 wherein the sheet of material is made from a thermally stable material.

17. A method according to claim 15 wherein the location of the folds are determined by creating a series of perforations along the desired fold line of the sheet of material.

18. A method according to claim 15 wherein the location of the folds are determined by creating a fold line of partial thickness in the sheet of material.

19. A method according to claim 15 wherein parts of the folded sheet material are joined together by dip soldering.

20. A method according to claim 15 wherein the template is formed from an etching process.

21. A method according to claim 15 wherein the template is cut from a sheet of material by a laser.

22. A method according to claim 21 wherein the template is cut form a sheet of material by a laser combined with a water jet.

23. A probe head for mounting on a coordinate position apparatus having an arm, wherein a structure comprising at least one sheet of thermally stable material is located within a metrology loop between a fixed surface of the probe head and the arm of the coordinate positioning apparatus and the structure is formed from folding the at least one sheet of material.

24. A probe head according to claim 23 wherein the structure of the at least one sheet of material at least partially encloses the fixed surface of the probe head.

* * * * *